March 20, 1962 — W. F. CHEVIRON — 3,026,401
ELECTRIC DEFROSTER

Filed Oct. 12, 1959 — 2 Sheets-Sheet 1

Wayne F. Cheviron
INVENTOR.

BY *Clarence A. O'Brien*
and *Harvey B. Jacobson*
Attorneys

March 20, 1962 W. F. CHEVIRON 3,026,401
ELECTRIC DEFROSTER

Filed Oct. 12, 1959 2 Sheets-Sheet 2

Wayne F. Cheviron
INVENTOR.

BY *Clarence A. O'Brien*
*and Harvey B. Jacobson*
Attorneys

United States Patent Office 3,026,401
Patented Mar. 20, 1962

3,026,401
ELECTRIC DEFROSTER
Wayne F. Cheviron, Lockport, Ill.
(1229 E. Cass St., Joliet, Ill.)
Filed Oct. 12, 1959, Ser. No. 845,877
3 Claims. (Cl. 219—39)

This invention relates to defrosters and more particularly defrosters for motor vehicles.

An object of the invention is to provide an electric defroster to serve as original equipment or to serve as an attachment for a motor vehicle, and to function in two ways. Initially, the defroster may be used to supplement the heat of the air of the defrosters of an ordinary motor vehicle defroster system, or may be used as the sole heat source in those instances wherein a motor vehicle is not equipped with a defroster system.

Briefly, the invention is embodied in a heater positioned adjacent to the inner surface of the windshield of the motor vehicle and which is electrically operative. The heater may have, in more comprehensive embodiments of the invention, a blower whose blades are mounted radially outwardly from the source of heat i.e. the heating element, in order to blow the heated air against the inner surface of the motor vehicle window, usually the windshield.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
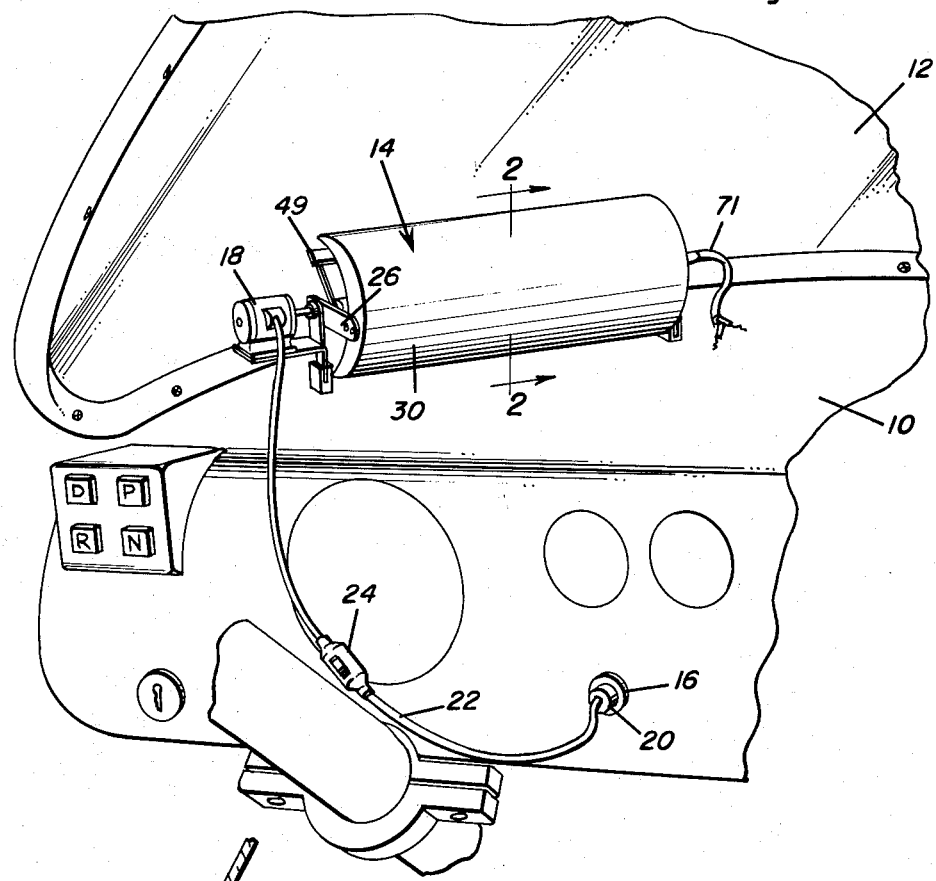
FIGURE 1 is a fragmentary perspective view of the inside of a motor vehicle showing one embodiment of the invention mounted adjacent to the inner surface of the windshield.
Figure 2:
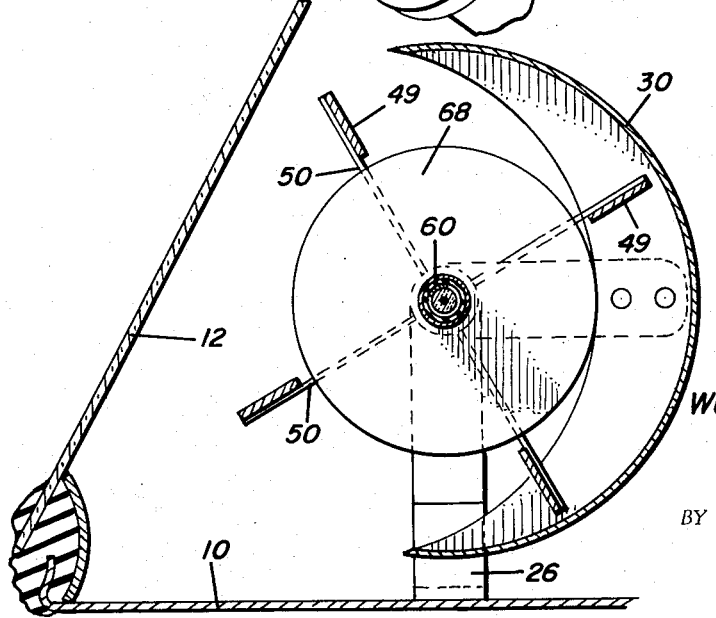
FIGURE 2 is a sectional view on an enlarged scale and taken on the line 2—2 of FIGURE 1.

In the accompanying drawings there is illustrated a portion of the interior of the motor vehicle, including instrument panel 10 and windshield 12. Inasmuch as the windshield of a motor vehicle is the window with which heater 14 will be used in most instances, windshield 12 is illustrated in preference to any other window of the motor vehicle. Cigarette lighter socket 16 is also illustrated as a source of electrical potential for electric motor 18. The plug 20 fitting into a ciragette socket 16 is connected by electrical conductor 22, and there is a switch 24 interposed in the line or conductor 24 to control energization of motor 18.

The electric defroster or heater 14 is made of a bracket assembly including brackets 26 and 28, each of which is quite similar in construction. These brackets may be magnetically held in place on the instrument panel 10 or secured in any other way, for instance held in place by screws, bolted, etc. Each bracket is formed of angular construction so that one side of each bracket forms means by which to support the deflector 30. The deflector 30 is preferably approximately semi-cylindrical in shape and when the heater 14 is mounted properly, the open part thereof faces the windshield 12.

A motor supporting bracket 32 is secured to bracket 26 and projects laterally outwardly therefrom. Electric motor 18 is secured to bracket 32, and has motor shaft 34 extended through an aperture 36 in bracket 26. Coupling 38 is connected to motor shaft 24, for instance by setscrew 40 or by some other structural equivalent, and a coupling includes a hub 42 mounted for rotation in coupling socket 44, the latter being stationarily secured to bracket 26.

Blower 48 is mounted for rotation within the confines of hood 30, and is made of a plurality of blades 49 connected by struts 50 to the hub 42 and to a similar hub 52 near bracket 28. Accordingly, it is now evident that upon energization of motor 18, the blower is set into operation.

The source of heat for defroster 14 is an elongate heating element 54 mounted at the axis of rotation of the blower. The heating element may be a ceramic rod wound with a resistance wire 56 and protected by an insulating sleeve 58 on the exterior of the resistance wire, and all contained within an outer tube 60 mounted by mounting nut assembly 66 on bracket 28. The hub 42 is free turning on sleeve or tube 60 whereby the heating element remains stationary while the blower is capable of rotating. A plurality of radially extending fins or disks 68 are secured to the tube or sleeve 60 and these are within the confines of the blower blades 49 and mounted in planes perpendicular to the axis of rotation of the blower. The fins conduct heat from the heating element radially outwardly to facilitate the removal of the heat from the heating element and the blowing of heated air by the blower onto the inner surface of the windshield 12.

Although conductor 71 is shown connected to the heating element as a separate cable from line 22, these may be physically included as a single cable.

Figure 3:
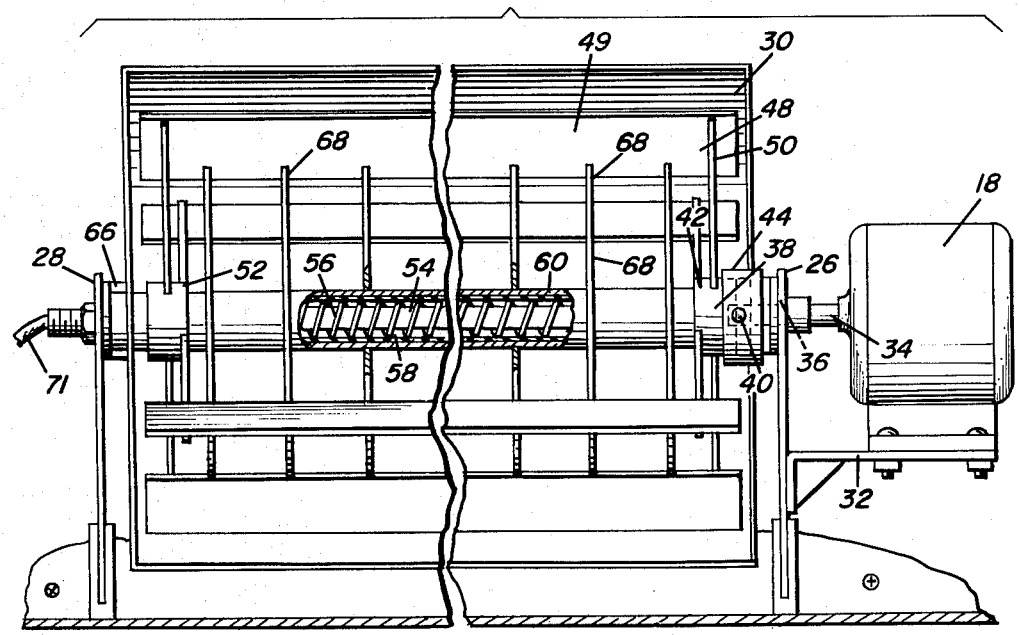
FIGURE 3 is a front elevational view of the heater, parts being broken away in section to illustrate an otherwise obscure detail.
Figure 4:
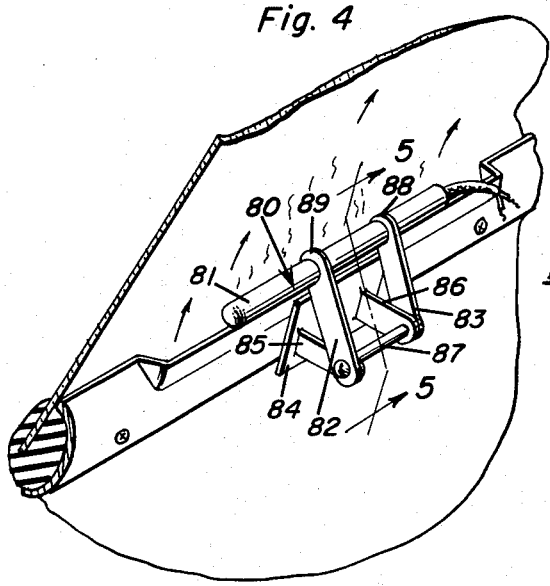
FIGURE 4 is a perspective view of a modification.
Figure 5:
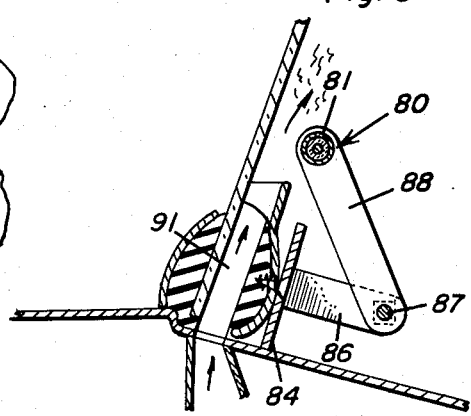
FIGURE 5 is an enlarged sectional view taken on the line 5—5 of FIGURE 4.

As shown in FIGURES 4 and 5, the principles of the invention are embodied in a simpler type of heater 80. The heating element 81 which is essentially identical to heating element shown in FIGURE 3, but may have the heating fins 68 omitted, is supported on a pair of brackets 82 and 83. These brackets include mounting plate 84 together with a pair of arms 85 and 86 fixed to the mounting plate. A spindle 87 extends through apertures in arms 85 and 86 and has the lower ends of arms 89 and 88 connected therewith. Consequently, the two arms 89 and 88 may be adjusted to a selected position by rotational movement with reference to the spindle 87, and held fixed by tightening the spindle, i.e. tightening the nut at the end thereof. This will automatically position the heating element 81 so that it will be in the air stream passing through passageway 91 which is the ordinary defroster passageway of a conventional motor vehicle heater system. In this form of the invention the heat of the air in the defroster system is supplemented. Whereas, the heater 14 may be the sole source of heat or air. Actually, there is no real reason why heater 14 cannot be used in situations such as shown in FIGURES 4 and 5 where a motor vehicle is already equipped with the defroster system.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A heater defroster adapted to be mounted on the upper surface of a vehicle instrument panel adjacent the lower edge portion of the vehicle windshield, said heater defroster comprising an elongated cylindrical heating element including a central ceramic rod extending axially therethrough, a coil of resistance heating wire spirally wound upon the rod, a tubular sleeve enclosing said coil and electrically insulated therefrom, a pair of brackets at the ends of said heating element for supporting it above said panel and including attaching means for securing said brackets to the instrument panel and retaining said heating element generally parallel to the windshield, a row of spaced annular fins coaxial with said heating element and secured to the outer surface of said sleeve between said pair of brackets, a first of said brackets being fixed to one end of said heating element, a pair of annular hubs journalled for rotation on opposite ends of said heating element, each of said hubs located between one end of said row and one of said brackets, struts connected at at their inner ends to said hubs and extending radially outwardly therefrom beyond said fins, the radially outer ends of the struts connected together by fan blades extending axially across said row of fins, a generally semi-cylindrical elongated housing substantially coaxial with said heating element and partially enclosing said fins, struts and blades, means supporting and connecting said housing to said brackets, a power means mounted on a second of said brackets and having a drive shaft extending through said last mentioned bracket which is drivingly connected to one of said hubs.

2. A device as defined in claim 1 wherein said attaching means includes magnetic means for securing said brackets to said upper surface of the instrument panel.

3. A device as defined in claim 2 wherein said power means comprises an electric motor, said motor having a power supply cord terminating in a male plug adapted to fit within the cigarette lighter recepacle of the vehicle.

References Cited in the file of this patent

UNITED STATES PATENTS

| | | |
|---|---|---|
| 447,143 | Ashbaugh | Feb. 24, 1891 |
| 1,465,292 | Wessig | Aug. 21, 1923 |
| 1,475,162 | Abbott | Nov. 27, 1923 |
| 1,819,443 | Schillo et al. | Aug. 18, 1931 |
| 1,838,812 | Dow | Dec. 29, 1931 |
| 1,868,905 | Kelly | July 26, 1932 |
| 1,995,769 | Fiege | Mar. 26, 1935 |
| 2,133,078 | Carter | Oct. 11, 1938 |
| 2,475,910 | Morrison | July 12, 1949 |
| 2,546,355 | Bloomer | Mar. 27, 1951 |
| 2,614,201 | Varis | Oct. 14, 1952 |
| 2,718,037 | Lintern | Sept. 20, 1955 |